United States Patent
Kim et al.

(10) Patent No.: US 10,108,373 B2
(45) Date of Patent: *Oct. 23, 2018

(54) HOST, SYSTEM, AND METHODS FOR TRANSMITTING COMMANDS TO NON-VOLATILE MEMORY CARD

(71) Applicant: Samsung Electronics Co., Ltd., Suwon-si, Gyeonggi-do (KR)

(72) Inventors: Kyeong Min Kim, Hwaseong-si (KR); Hong Sik Park, Yongin-si (KR); Hee Dong Shin, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,749

(22) Filed: Jun. 24, 2016

(65) Prior Publication Data
US 2016/0306594 A1    Oct. 20, 2016

Related U.S. Application Data

(63) Continuation of application No. 14/025,334, filed on Sep. 12, 2013, now Pat. No. 9,389,804.

(30) Foreign Application Priority Data

Sep. 14, 2012    (KR) .................. 10-2012-0102484

(51) Int. Cl.
*G06F 3/06* (2006.01)
*G06F 12/02* (2006.01)
*G06F 13/16* (2006.01)

(52) U.S. Cl.
CPC ............ *G06F 3/0659* (2013.01); *G06F 3/061* (2013.01); *G06F 3/0604* (2013.01);
(Continued)

(58) Field of Classification Search
None
See application file for complete search history.

(56) References Cited

U.S. PATENT DOCUMENTS 5,526,484 A    6/1996   Casper et al.
5,610,808 A  * 3/1997   Squires ................. G06F 3/0601
                                                       360/78.12
(Continued)

FOREIGN PATENT DOCUMENTS

CN    1475922 A    2/2004
JP    2006252079 A    9/2006
(Continued)

OTHER PUBLICATIONS

Nam et al., "Ozone (O3): An Out-of-Order Flash Memory Controller Architecture," IEEE Transactions on Computers, May 2011, p. 653-666, vol. 60, No. 5, IEEE Computer Society.
(Continued)

*Primary Examiner* — Sean D Rossiter
*Assistant Examiner* — Charles J Choi
(74) *Attorney, Agent, or Firm* — Harness, Dickey & Pierce, P.L.C.

(57) ABSTRACT

A host for controlling a non-volatile memory card, a system including the same, and methods of operating the host and the system are provided. The method of operating the host connected with the non-volatile memory card through a clock bus, a command bus, and one or more data buses includes transmitting a first command to the non-volatile memory card through the command bus, transmitting first data corresponding to the first command to the non-volatile memory card through the one or more data buses or receiving the first data from the non-volatile memory card through the data buses, and transmitting a second command to the
(Continued)

non-volatile memory card at least once through the command bus during or before transfer of the first data.

17 Claims, 17 Drawing Sheets

(52) U.S. Cl.
CPC .......... *G06F 3/0611* (2013.01); *G06F 3/0613* (2013.01); *G06F 3/0656* (2013.01); *G06F 3/0679* (2013.01); *G06F 12/0246* (2013.01); *G06F 13/1684* (2013.01); *G06F 2221/2105* (2013.01); *G06F 2221/2153* (2013.01)

(56) References Cited

U.S. PATENT DOCUMENTS

| | | | |
|---|---|---|---|
| 6,081,860 A * | 6/2000 | Bridges | G06F 13/364 710/107 |
| 6,323,867 B1 | 11/2001 | Nookala et al. | |
| 6,496,192 B1 | 12/2002 | Shreesha et al. | |
| 6,944,060 B2 | 9/2005 | Honda et al. | |
| 7,708,195 B2 | 5/2010 | Yoshida et al. | |
| 7,818,479 B2 | 10/2010 | Takeuchi et al. | |
| 7,984,214 B2 | 7/2011 | Heizmann | |
| 8,185,713 B2 | 5/2012 | Shin et al. | |
| 8,321,647 B2 | 11/2012 | Khmelnitsky et al. | |
| 2004/0109358 A1 | 6/2004 | Roohparvar et al. | |
| 2005/0223158 A1 | 10/2005 | See et al. | |
| 2009/0094678 A1 | 4/2009 | Floman et al. | |
| 2010/0131701 A1 | 5/2010 | Fujiwara | |
| 2010/0191901 A1* | 7/2010 | Toyama | G06F 3/0613 711/103 |
| 2010/0262979 A1* | 10/2010 | Borchers | G06F 9/544 719/321 |
| 2010/0318842 A1 | 12/2010 | Utsuki | |
| 2011/0208905 A1 | 8/2011 | Shaeffer et al. | |
| 2012/0089797 A1* | 4/2012 | Shibayama | G06F 11/3419 711/162 |
| 2013/0019053 A1 | 1/2013 | Somanache et al. | |
| 2013/0151776 A1 | 6/2013 | Edelhaeuser et al. | |

FOREIGN PATENT DOCUMENTS

| | | |
|---|---|---|
| JP | 2008052622 A | 3/2008 |
| KR | 20100115583 A | 10/2010 |
| WO | WO-2010/105520 A1 | 9/2010 |

OTHER PUBLICATIONS

Search Report for Dutch Patent Application No. 2011439 dated Apr. 8, 2015.
Chinese Office Action corresponding to Chinese Patent Application No. 201310421932.9 dated Jun. 2, 2017.
JEDEC Solid State Technology Association, Embedded Multimedia Card (eMMC), Electrical Standard (version 4.51), i.e., JESD84-B451, Jun. 2012.
Office Action for Corresponding Japanese Patent Application No. 2013-192280 dated Aug. 1, 2017.

* cited by examiner

HOST, SYSTEM, AND METHODS FOR TRANSMITTING COMMANDS TO NON-VOLATILE MEMORY CARD

CROSS-REFERENCE TO RELATED APPLICATIONS

This application is a continuation of and claims priority under 35 U.S.C. §§ 120/121 to U.S. patent application Ser. No. 14/025,334, filed on Sep. 12, 2013, which claims priority under 35 U.S.C. § 119(a) from Korean Patent Application No. 10-2012-0102484 filed on Sep. 14, 2012, the disclosures of each of which are hereby incorporated by reference in their entirety.

BACKGROUND

Example embodiments of the inventive concepts relate to a host for controlling a non-volatile memory card, and more particularly, to a host for increasing read/write performance of the non-volatile memory card, a system including the same, and method of operating the host and the system.

A multimedia card (MMC) is a representative one of non-volatile memory cards. The MMC is a flash memory card standard. An eMMC is an embedded MMC standard defined by the Joint Electron Devices Engineering Council (JEDEC). With eMMC, communication is based on a 10-signal bus. The eMMC may be embedded in mobile communication devices like smart phones.

SUMMARY

According to some example embodiments of the inventive concepts, there is provided a method of operating a host connected with a non-volatile memory card through a clock bus, a command bus, and one or more data buses. The method includes transmitting a first command to the non-volatile memory card through the command bus, transmitting first data corresponding to the first command to the non-volatile memory card through the one or more data buses or receiving the first data from the non-volatile memory card through the one or more data buses, and transmitting a second command to the non-volatile memory card at least once through the command bus during or before transfer of the first data.

The second command may be transmitted when the non-volatile memory card is in a busy state.

The busy state of the non-volatile memory card may be indicated by one of the one or more data buses.

The method may further include operating a command bus state machine for managing states of the command bus and operating a data bus state machine for managing states of the one or more data buses independently from the command bus state machine. The states of the one or more data buses may include an idle state, a data transfer state, and a receive-response or wait state. The second command may be transmitted to the non-volatile memory card when a state of the one or more data buses is the data transfer state or the receive-response or wait state.

The first command may be a command accompanied by data and the second command may be a command that is not accompanied by data.

The method may further include managing the number of transmission times of the second command.

According to other example embodiments of the inventive concepts, there is provided a method of operating a non-volatile memory card system including a host connected with a non-volatile memory card through a clock bus, a command bus, and one or more data buses. The method includes the host transmitting a first command to the non-volatile memory card through the command bus; transferring first data corresponding to the first command between the host and the non-volatile memory card through the one or more data buses; and the host transmitting a second command to the non-volatile memory card through the command bus during the transfer of the first data.

The method may further include the non-volatile memory card sequentially receiving a plurality of second commands and storing them in a command register. The transmitting the second command to the non-volatile memory card may include the host transmitting the plurality of second commands of the same type to the non-volatile memory card.

Each of the second commands may be a prepare-read command including a data size indicating a size of data to be read and a start address. The data size and the start address may be stored in the command register.

The method may further include the non-volatile memory card reading data from a non-volatile memory and storing the data in a data buffer included in the non-volatile memory card in response to each second command.

The method may further include the host transmitting a third command to the non-volatile memory card; and the non-volatile memory card transmitting the data stored in the data buffer to the host in response to the third command.

The method may further include the host transmitting a cancel command for specifically cancelling all or some of the plurality of second commands to the non-volatile memory card; and the non-volatile memory card invalidating the all or some of the second commands specified by the cancel command or data corresponding to the specified all or some of the second commands in response to the cancel command.

Each of the second commands may be a prepare-write command including a data size indicating a size of data to be written and a start address.

The method may further include the host transmitting second data corresponding to a first second command among the plurality of second commands to the non-volatile memory card through the one or more data buses; the non-volatile memory card receiving and programming the second data to the non-volatile memory in response to the first second command; the host transmitting a second command among the plurality of second commands to the non-volatile memory card while the second data is being transmitted through the one or more data buses; the host transmitting third data corresponding to the second command to the non-volatile memory card through the one or more data buses after the second data is completely transmitted; and the non-volatile memory card receiving and programming the third data to the non-volatile memory in response to the second command.

According to further example embodiments of the inventive concepts, there is provided a host connected with a non-volatile memory card through a clock bus, a command bus, and one or more data buses. The host includes a processor configured to control overall operation of the host and a host controller configured to be electrically connected with the processor and to interface with the non-volatile memory card.

The host controller may transmit a first command to the non-volatile memory card through the command bus, transmit first data corresponding to the first command to the non-volatile memory card through the data bus or receive the first data from the non-volatile memory card through the one or more data buses, and transmit a second command to the non-volatile memory card through the command bus during or before transfer of the first data.

According to example embodiments of the inventive concepts, a method of operating a host connected to a non-volatile memory includes transmitting a first command from the host to the non-volatile memory card through a command bus, the first command indicating first data; transferring the first data by performing at least one of, transmitting the first data from the host to the non-volatile memory card through one or more data buses, and receiving, at the host, the first data from the non-volatile memory card through the one or more data buses; and transmitting a second command to the non-volatile memory card through the command bus during or before the transfer of the first data.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
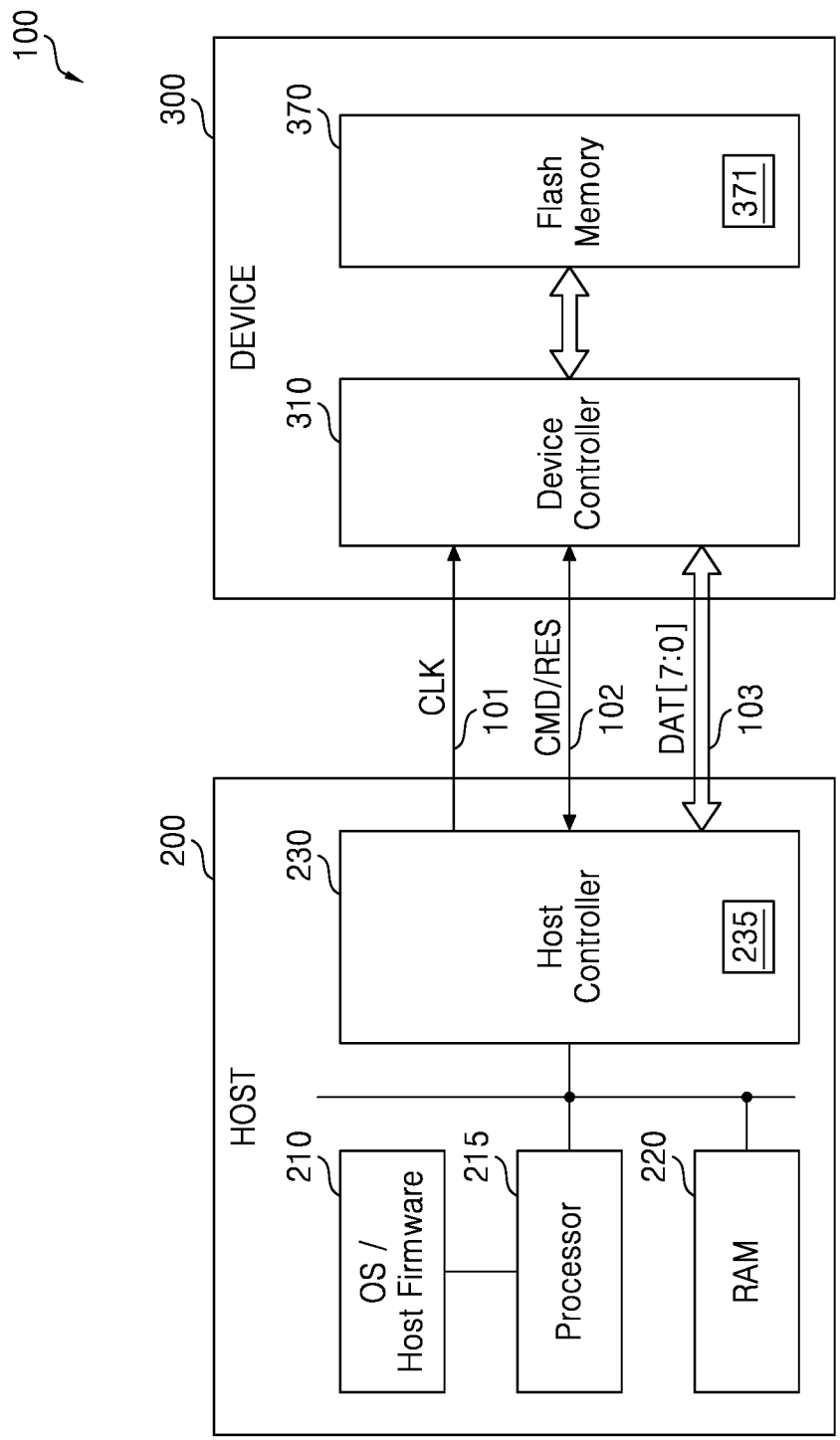
FIG. 1 is a block diagram of a non-volatile memory card system according to some example embodiments of the inventive concepts.

Example embodiments of the inventive concepts will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The embedded multimedia card (eMMC), electrical standard (version 4.51), i.e., JESD84-B451, published by the Joint Electron Devices Engineering Council (JEDEC) (http://www.jedec.org) in June 2012 is hereby incorporated by reference. Accordingly, unless otherwise defined, terms and definitions used herein have the same meaning as defined in the JESD84-B451.

Various example embodiments of the inventive concepts include lines (or channels) in addition to an existing 10-wire bus in order to increase noise immunity and a transmission speed of data transferred between a host and a device.

Herein, a channel transmitting a signal or a voltage may be a host pad, an eMMC pad, a bus, a line, a driver (including a differential amplifier in some embodiments), a receiver (including a differential amplifier in some embodiments), or a combination of at least two thereof. The functions of the lines and circuits and methods for generating a signal transmitted through the lines will be described in detail hereinafter.

Unless explicitly otherwise described with a specific intention, the propagation delay of a functional circuit such as a bus, a wire, a pad (or a pin), a driver, a receiver, and/or a differential amplifier is not considered for convenience' sake in the description.

FIG. 1 is a block diagram of an eMMC system 100 according to some example embodiments of the inventive concepts. The eMMC system 100 includes a host 200 and a device 300. The device 300 is a non-volatile memory card such as a secure digital (SD) card, MMC or eMMC. However, example embodiments of the inventive concepts are not restricted thereto.

In some example embodiments of the inventive concepts, the device 300 is an eMMC.

The host 200 may control data processing operations such as a data read operation and a data write operation. The data processing operations may be performed at a single data rate (SDR) or a double data rate (DDR).

The host 200 may be a data processing device, such as a central processing unit (CPU), a processor, a microprocessor, or an application processor, which can process data. The data processing device may be embedded or implemented in an electronic device. The electronic device may be implemented as a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The eMMC 300 may be electrically connected with the electronic device through connection means (e.g., pads, pins, buses, or communication lines) to communicate with the host 200A.

The host 200 may include a processor 215, a memory 220, and a host controller 230. An operating system (OS)/host firmware 210 may be driven by the processor 215. The memory 220 may include a DRAM and a SRAM.

The host 200 may also include a clock generator (not shown). The clock generator generates a clock signal CLK used in the host 200 and the eMMC 300. The clock generator may be implemented by a phase locked loop (PLL).

The processor 215 may be hardware that controls the generation of a command CMD, the analysis of a response RES, the process of data stored in an extended card specific data (CSD) register (or an EXT_CSD register) 371, and/or the process of other data. The processor 215 may drive the OS/host firmware 210 to perform these operations.

The host controller 230 interfaces with the eMMC 300. The host controller 230 issues the command CMD to the eMMC 300, receives the response RES to the command CMD, transmit write data to the eMMC 300, and receives read data from the eMMC 300.

The host controller 230 may include host command registers 235 for storing information about commands transmitted to the eMMC 300. The host command registers 235 may be provided separated from a memory (e.g., 220) within the host 200 or may be provided in the memory (e.g., 220).

The eMMC buses illustrated in FIG. 1 may include ten conventional buses 101, 102, and 103 (for example, defined in eMMC 4.51). However, example embodiments of the inventive concepts are not restricted thereto. For instance, eMMC buses may also include a unidirectional return clock bus (not shown) that transmits a return clock signal (not shown) from the eMMC 300 to the host 200.

The clock bus 101 transmits the clock signal CLK. The bidirectional command bus 102 transmits the command CMD to the eMMC 300 and transmits the response RES to the command CMD to the host 200. The bidirectional data bus 103 transmits write data DAT[7:0] to the eMMC 300 for the data write operation and transmits read data DAT[7:0] to the host 200 for the data read operation.

The host 200 may transmit a hardware reset signal to the eMMC 300 through a reset line (not shown). The host 200 may generate operating voltages necessary for the operations of the eMMC 300 and transmit them to the eMMC 300.

Figure 2:
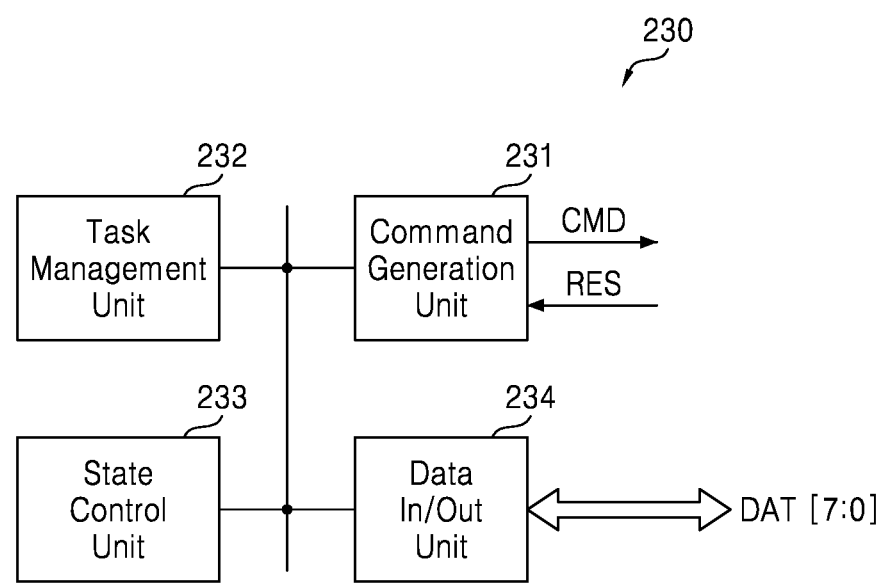
FIG. 2 is a block diagram of a host controller illustrated in FIG. 1 according to some example embodiments of the inventive concepts.

FIG. 2 is a block diagram of the host controller 230 illustrated in FIG. 1 according to some example embodiments of the inventive concepts. The host controller 230 includes a command generation unit 231, a data input/output (I/O) unit 234, a task management unit 232, and a state control unit 233. The task management unit 232 may manage the creation and termination of a task.

The command generation unit 231 may generate the command CMD at the request of a task and send the command CMD to the eMMC 300. It may also receive the response RES to the command CMD.

The data I/O unit 234 may transmit the data DAT[7:0] to the eMMC 300 through the bidirectional data buses 103 in a write operation and may receive the data DAT[7:0] from a flash memory 370 through the bidirectional data buses 103 in a read operation.

The state control unit 233 may independently control a command bus state machine for managing the state of the command bus 102 and a data bus state machine for managing the state of the data bus 103. The operation of the state control unit 233 will be described with reference to FIGS. 6 and 7 later.

The elements of the host controller 230 illustrated in FIG. 2 may be implemented in hardware, software, or a combination thereof. For instance, some or all of the elements of the host controller 230 may be implemented in firmware.

Figure 3:
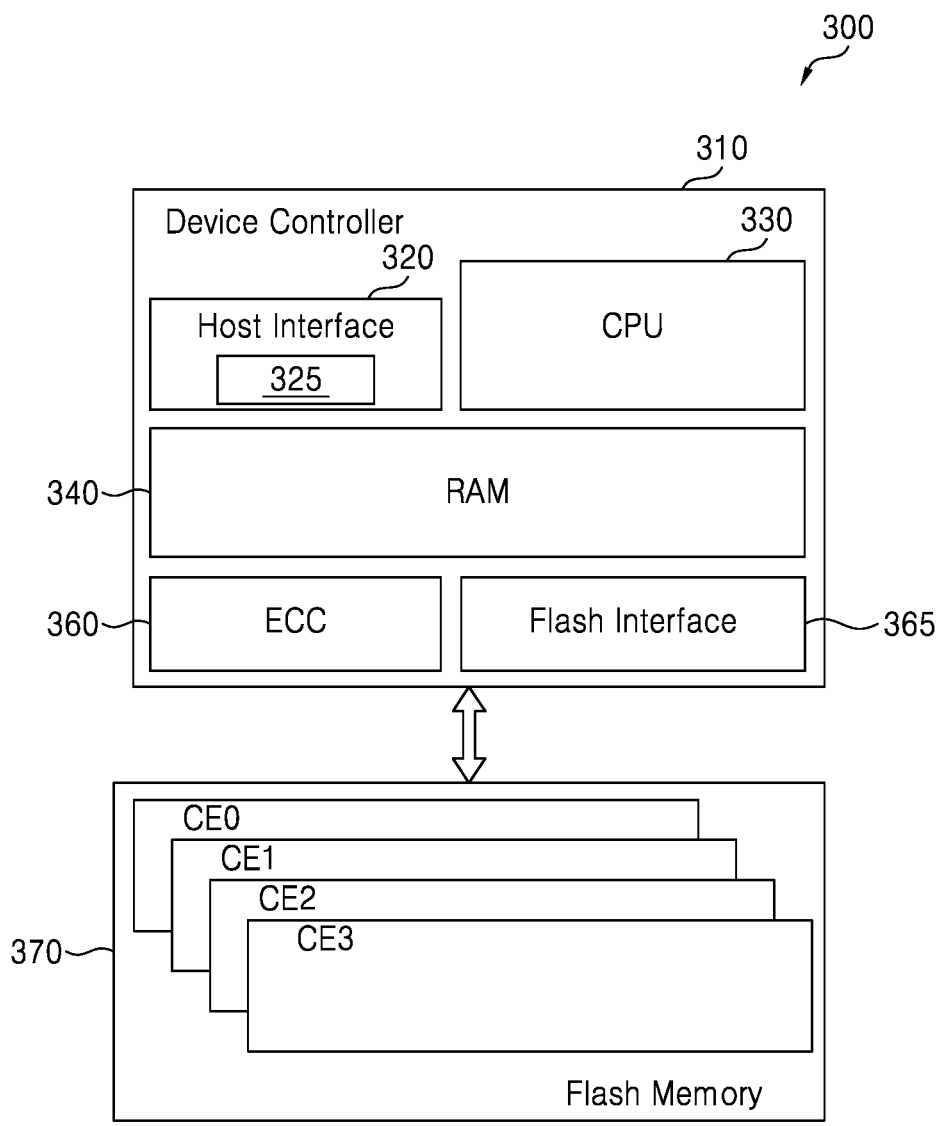
FIG. 3 is a block diagram of an embedded multimedia card (eMMC) according to some example embodiments of the inventive concepts.

FIG. 3 is a block diagram of the eMMC 300 according to some example embodiments of the inventive concepts. Referring to FIG. 3, the eMMC 300 includes a device controller, e.g., an eMMC controller, 310 and the flash memory 370.

The eMMC controller 310 controls data communication between the host 200 and the flash memory 370. The eMMC controller 310 includes an eMMC host interface 320, a CPU 330, a memory 340, an error correction code (ECC) block 360, and a flash interface 365.

The eMMC host interface 320 receives the clock signal CLK and the command CMD from the host 200, interprets the command CMD, generates the response RES according to an interpretation result, and transmits the response RES and data generated based on the response RES to the host 200. The eMMC host interface 320 may include a device command register 325 for storing information about commands received from the host 200. The device command register 325 may be implemented separately from a memory (e.g., 340) within the device controller 310 or may be implemented using the memory.

Figure 4A:
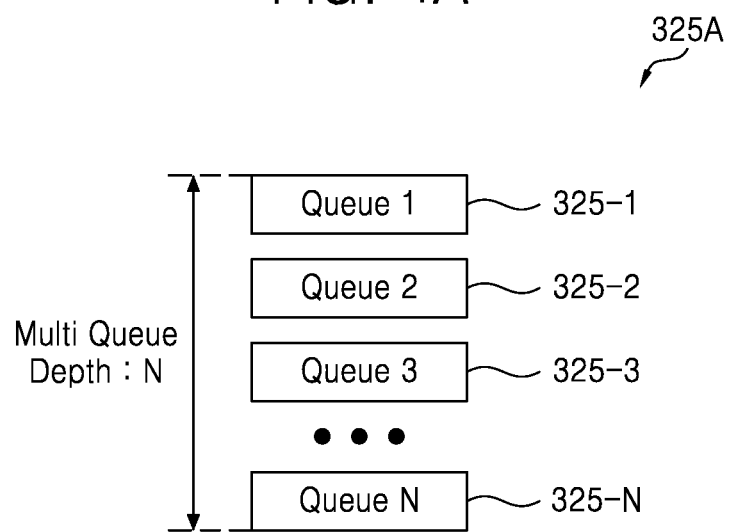
FIG. 4A is a diagram of an example of a device command register illustrated in FIG. 3.

FIG. 4A is a diagram of an example 325A of the device command register 325 illustrated in FIG. 3. The device command register 325A includes N registers 325-1 through 325-N where N is a natural number of at least 2 and indicates the size of the device command register 325A, i.e., the number of registers included in the device command register 325A. Here, N is defined as a multi-queue depth. Accordingly, the eMMC host interface 320 may receive up to as many commands as a maximum multi-queue depth from the host 200 and store the commands in the registers 325-1 through 325-N, respectively.

A command according to the current embodiments is a command predefined between the host 200 and the eMMC 300 to allow a command received from the host 200 to be stored in the eMMC 300 so that before an operation corresponding to a current command is completed (for example, before data read from the flash memory 370 is transmitted to the host 200 or before data received from the host 200 is programmed to the flash memory 370), a subsequent command can be received.

In other words, the command according to the current embodiments is not a conventionally defined command in an eMMC but is newly defined command in order to increase an overall data transfer rate by allowing the eMMC 300 to receive another command even in a busy state (e.g., a data read operation or a data write operation).

According to a conventional eMMC protocol, during data transfer or while the eMMC is in the busy state, a host cannot send commands (a read command and a write command) other than a stop or abort command and a status check command to an eMMC. The stop or abort command is for stopping data transfer and the status check command is for checking the state of a device. For instance, according to the conventional eMMC protocol, commands cannot be transmitted in a send-data state, a receive-data state, and a program state and can be transmitted only in a transfer state after the completion of an operation. Therefore, performance decreases due to protocol overhead.

According to the example embodiments of the inventive concepts, even during the data transfer or the busy state of the eMMC 300, the host 200 can send a command to the eMMC 300 so that the eMMC 300 prepares for subsequent data transmission, thereby increasing data transfer performance. A command according to the example embodiments of the inventive concepts may not be the stop or abort command or the status check command but may be a preparation command for preparation of subsequent data transfer, a command for canceling the preparation command, or a command for reading data prepared in response to the preparation command. Commands may be stored in the registers 325-1 through 325-N illustrated in FIG. 4A.

The registers 325-1 through 325-N store information (hereinafter, referred to as command information) about a command issued from the host 200. For instance, the eMMC host interface 320 may store information about a first command in the first register 325-1 and store information about a second command in the second register 325-2. In this manner, the eMMC host interface 320 may store command information about up to N commands in the registers 325-1 through 325-N.

Figure 4B:
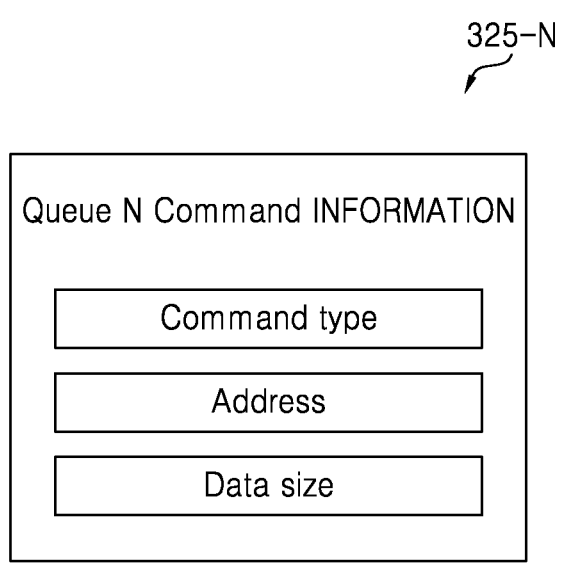
FIG. 4B is a diagram of an example of command information stored in a register illustrated in FIG. 4A.

FIG. 4B is a diagram of an example of command information stored in the register 325-N illustrated in FIG. 4A. The command information may include a command type, an address, and a data size. However, example embodiments of the inventive concepts are not restricted to the current embodiments. The command type, the address, and the data size may be included in a command issued by the host 200 and transferred to the eMMC 300.

The command type is a field indicating a type of a command and may include a prepare-read command and a prepare-write command. The address indicates an address at which the command is executed. The data size indicates the size of data on which the command is executed. For instance, when the command is a prepare-read command, the address is 100, and the data size is 1024; it may instruct to read data of 1024 bytes at an address of 100. However, the unit of a data size is not restricted to bytes. A different unit such as the number of blocks or pages of a predetermined size may be used.

Figure 5:
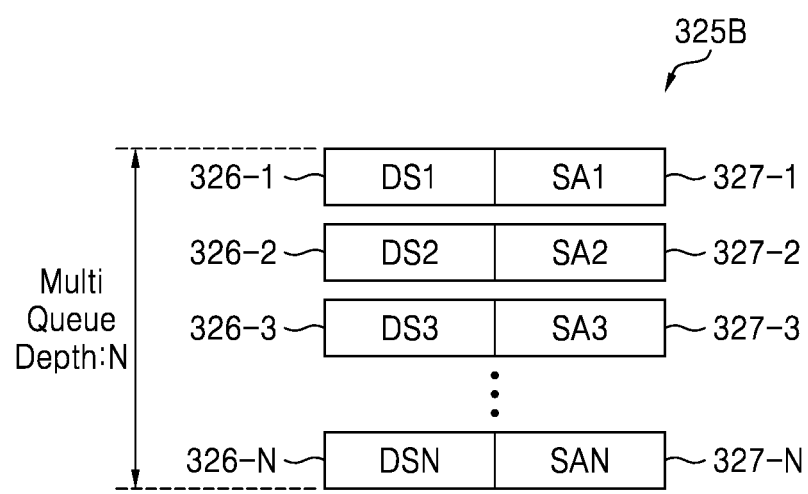
FIG. 5 is a diagram of another example of the device command register illustrated in FIG. 3.

FIG. 5 is a diagram of another example 325B of the device command register 325 illustrated in FIG. 3. The device command register 325B may include data size registers 326-1 through 326-N respectively storing data sizes DS1 through DSN and address registers 327-1 through 327-N respectively storing start addresses SA1 through SAN. The data sizes DS1 through DSN and the start addresses SA1 through SAN may be information included in commands.

In the example embodiments of the inventive concepts, a command may include a command (hereinafter, referred to as a size specifying command) for specifying the size of data to be read or written and a command (hereinafter, referred to as an address specifying command) for specifying a start address indicating the position of the data.

The size specifying command may include a command type and a data size. The command type is a field or an argument that indicates a type of command. The data size may be a block count, but example embodiments of the inventive concepts are not restricted thereto. A block is a data unit with a predetermined size and may correspond, for instance, to a page of flash memory. However, example embodiments of the inventive concepts are not restricted thereto. The data size of the size specifying command may be stored in a corresponding one of the data size registers 326-1 through 326-N.

The address specifying command may include a command type and a start address. The start address in the address specifying command may be stored in a corresponding one of the address registers 327-1 through 327-N.

The host command register 235 of the host 200 may be similar to the device command register 325A or 325B illustrated in FIG. 4A or 5.

The host controller 230 may include the host command register 235 that manages commands transmitted to the eMMC 300 to store command information.

The CPU 330 controls the operations of the interfaces 320 and 365 and controls the overall operation of the eMMC 300. The memory 340 temporarily stores data transferred between the interfaces 320 and 365. The memory 340 may be implemented by volatile memory.

The flash memory 370 stores data. When the flash memory 370 is implemented by NAND flash memory, the flash interface 365 may be implemented by a NAND flash interface. The flash memory 370 includes the EXT_CSD register 371 that stores device properties and selected modes.

The flash memory 370 may include a plurality of memory elements CE0 through CE3. Although four memory elements CE0 through CE3 are illustrated in FIG. 3, example embodiments of the inventive concepts are not restricted to the current embodiments. The flash memory 370 may have a structure that supports at least two channels. The host 200 may issue SEND_EXT_CSD (CMD8) to read the EXT_CSD register 371. The eMMC 300 transmits data in the EXT_CSD register 371, which is 512 bytes in length, as a data block to the host 200. A multi-queue depth may be set in a reserved field of the EXT_CSD register 371. Alternatively, the multi-queue depth may be set in another host control register, which can be controlled or set by the host 200.

Figure 6:
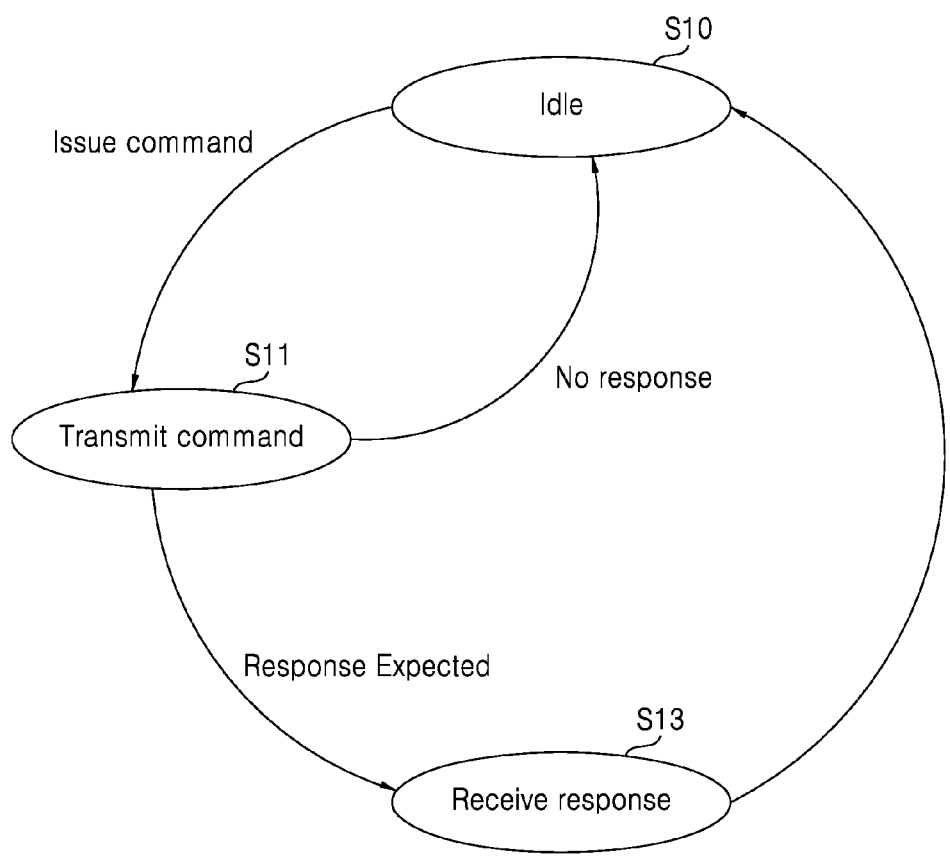
FIG. 6 is a diagram of a command bus state machine according to some example embodiments of the inventive concepts.
Figure 7:
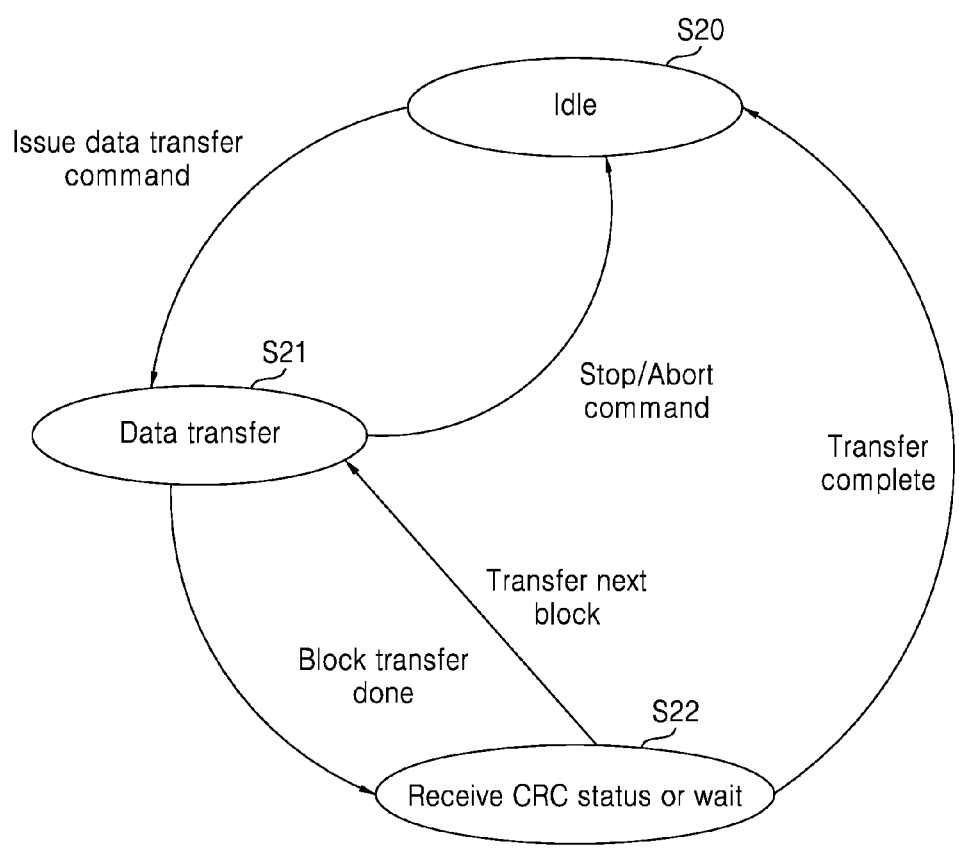
FIG. 7 is a diagram of a data bus state machine according to some example embodiments of the inventive concepts.

FIG. 6 is a diagram of a command bus state machine according to some example embodiments of the inventive concepts. FIG. 7 is a diagram of a data bus state machine according to some example embodiments of the inventive concepts.

Referring to FIG. 6, a command bus state may be an idle state S10, a transmit-command state S11, or a receive-response state S13. However, the command bus state is not restricted to these three states in FIG. 6. When there is a command to be transmitted to the eMMC 300, the host controller 230 switches the command bus state from the idle state S10 to the transmit-command state S11 so that the command is transmitted to the eMMC 300. After the command is transmitted to the eMMC 300, the command bus state is switched to the receive-response state S13 when the command expects a response. When the response to the command is received from the eMMC 300, the command bus state is switched to the idle state S10. When the command does not expect a response, the command bus state is switched from the transmit-command state S11 to the idle state S10. A stand-by state (not shown) lasting during a predetermined number of clock cycles may be intervened in the transition from the receive-response state S13 to the idle state S10 and the transition from the transmit-command state S11 to the idle state S10.

Referring to FIG. 7, a data bus state may be an idle state S20, a data transfer state S21, or a receive-response or wait state, and specifically, a receive-cyclic redundancy check (CRC) status or wait state S22. However, the data bus state is not restricted to these three states in FIG. 7. When the host controller 230 transmits a command accompanied by data transfer (hereinafter, referred to as a data transfer command) to the eMMC 300, the data bus state is switched from the idle state S20 to the data transfer state S21 so that data corresponding to the data transfer command is transmitted to the eMMC 300. The data may be transmitted in units of blocks. For instance, when the transmission of data of a block is completed, the data bus state is switched to the receive-CRC status or wait state S22 and the host controller 230 stands by until receiving a CRC status response corresponding to the block.

When receiving the CRC status response, the host controller 230 switches into the data transfer state S21 and transmits data of a next block and then switches into the receive-CRC status or wait state S22. When the transmission of data of all blocks is completed, the host controller 230 switches into the idle state S20.

The state control unit 233 independently operates the command bus state machine and the data bus state machine.

It is apparent that the command bus state and the data bus state may be related with each other. However, the command bus state and the data bus state are not operated in a single state machine but are operated in separate machines, respectively.

For instance, even when the data bus state is not an idle state, that is, the data bus state is a data transfer state or receive-CRC status or wait state, the host 200 may transmit a command (e.g., a command that is not accompanied by data transfer, a cancel command, or the like) to thy eMMC 300. A command may be largely divided into two types: one is a data transfer command; and the other is a command that is not accompanied by data transfer (hereinafter, referred to as a non-data transfer command).

Figure 8:
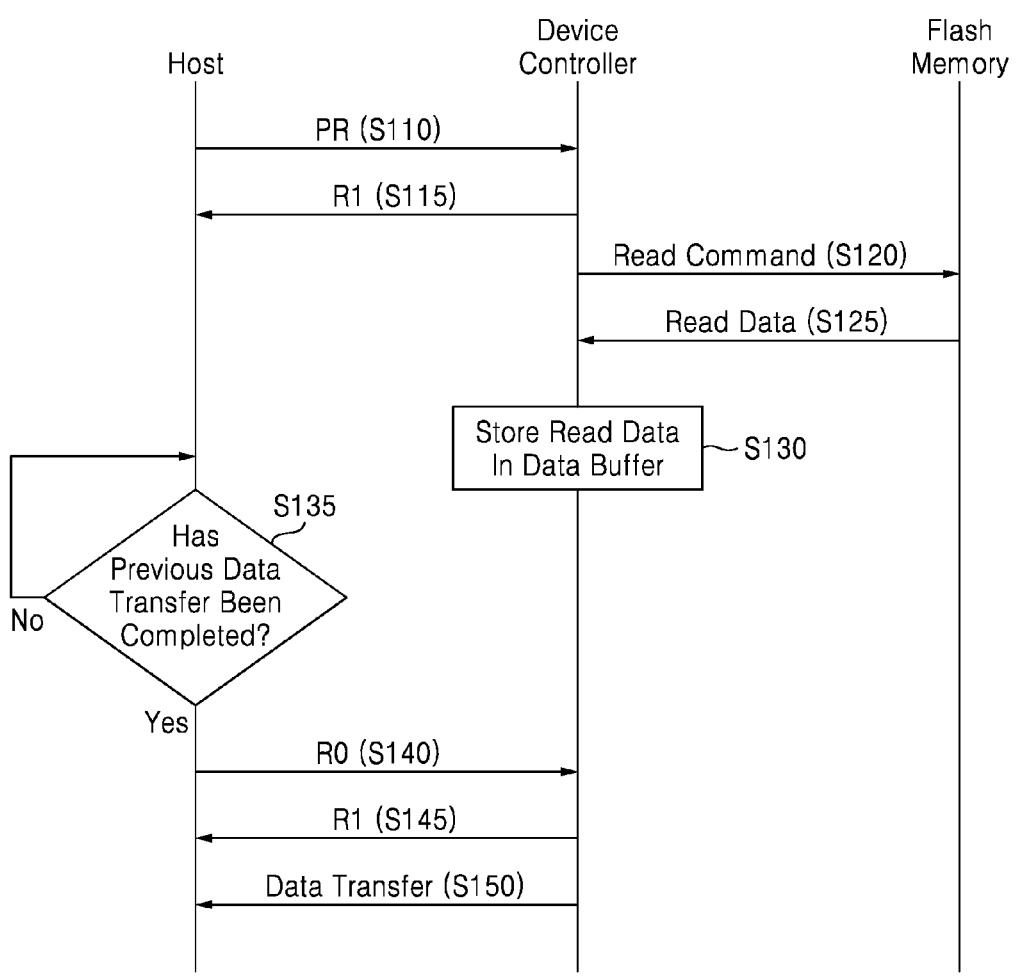
FIG. 8 is a flowchart of a method of operating a non-volatile memory card system according to some example embodiments of the inventive concepts.

FIG. 8 is a flowchart of a method of operating a non-volatile memory card system according to some example embodiments of the inventive concepts. The method may be performed using the non-volatile memory card system 100 illustrated in FIG. 1.

The host 200 transmits a prepare-read (PR) command to the device controller 310 in operation S110. The device controller 310 may send an R1 response to the host 200 in response to the PR command in operation S115 and store PR command information in a command register.

The PR command instructs the eMMC 300 to prepare a data read operation and is a non-data transfer command. The PR command may be transmitted to the device controller 310 even while data is being transmitted or the eMMC 300 is in a busy state. In addition, a plurality of (e.g., a multi-queue depth) PR commands may be transmitted. In other words, operations S110 and S115 may be repeated multiple times. The host 200 may also include a command counter (not shown) to count the number of PR commands transmitted.

The PR command may include a data size specifying the size of data to be read and a start address specifying a start address of the data. The data size and the start address may be stored in the command register 325A or 325B as shown in FIG. 4A or FIG. 5.

The device controller 310 sends a read command to the flash memory 370 according to the start address and the data size stored in the command register 325 in operation S120 and reads data from the flash memory 370 in operation S125. The read data is stored in a data buffer in operation S130.

The data buffer is provided to store data according to a PR command. The memory 340 shown in FIG. 3 may be used as the data buffer.

When previous data transfer is completed (i.e., it is YES) in operation S135, the host 200 transmits a data read-out (RO) command to the device controller 310 in operation S140. In response to the data RO command from the host 200, the device controller 310 sends an R1 response to the host 200 in operation S145 and transmits the data in the data buffer to the host 200 in operation S150.

The data RO command instructs the data, which has been stored in the data buffer according to the PR command, to be transmitted to the host 200. It is a data transfer command. The data RO command may be transmitted to the eMMC 300 when the data bus state is the idle state after the previous data transfer is completed.

Figure 9:
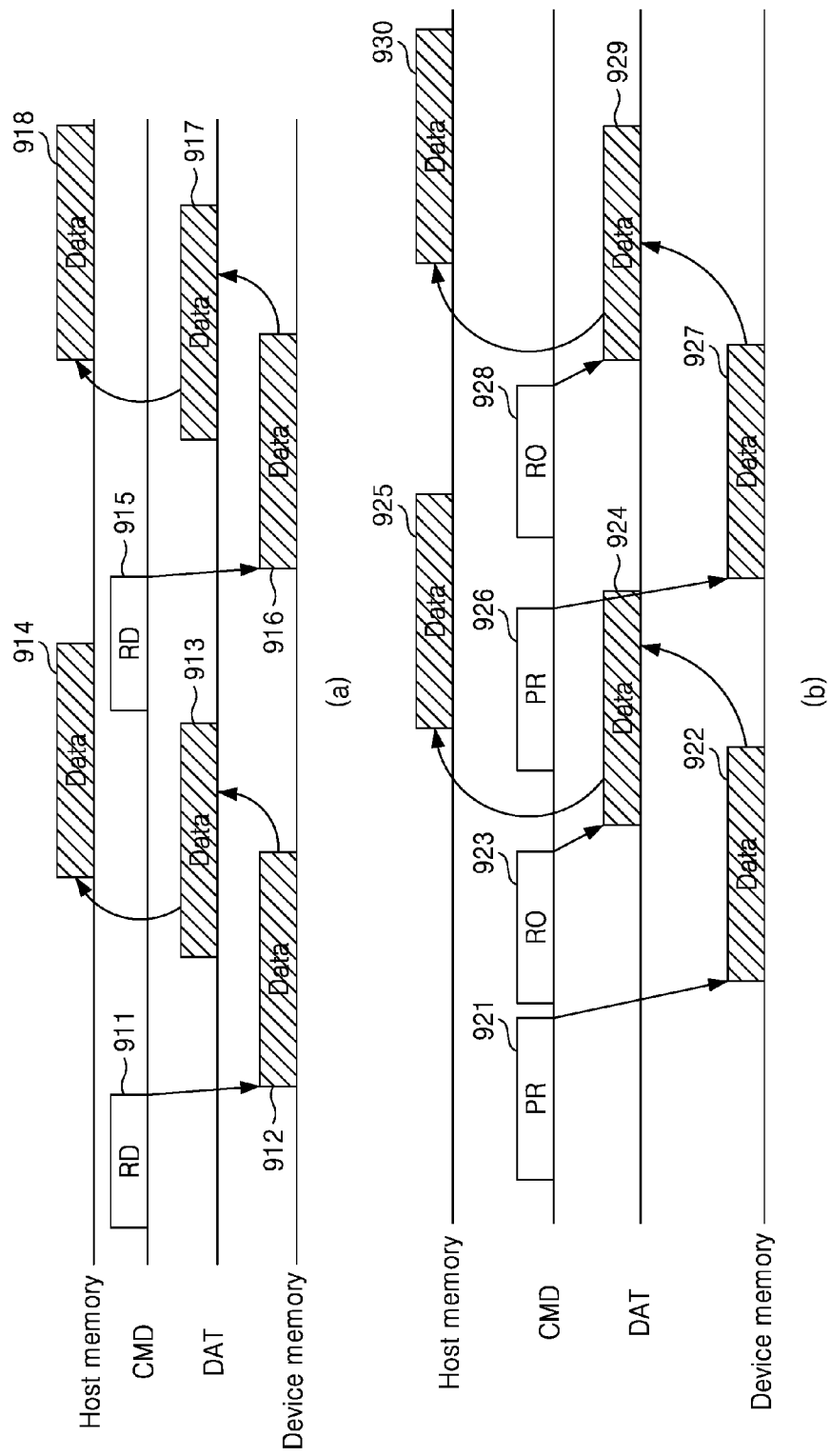
FIG. 9 is a schematic timing chart for the comparison between a conventional read operation of an eMMC and a read operation according to some example embodiments of the inventive concepts.

FIG. 9 is a schematic timing chart for the comparison between a conventional read operation of an eMMC and a read operation according to some example embodiments of the inventive concepts. Part (a) in FIG. 9 shows the conventional read operation and part (b) in FIG. 9 shows the read operation according to the current example embodiments of the inventive concepts.

Referring to part (a) in FIG. 9, when a host sends a read-read (RD) command 911 to an eMMC through a command bus, the eMMC reads (912) data from a flash memory in response to the RD command 911 and transmits (913) the data to the host through a data bus DAT. The host receives the read data through the data bus DAT and stores (914) it in a host memory.

Only after receiving (913) the data corresponding to the RD command 911, the host can send a next RD command 915 to the eMMC. Accordingly, the host is forced to wait for the data to be received (913) after sending the RD command 911.

Referring to part (b) in FIG. 9, the host 200 sends a first PR command 921 to the eMMC 300. The eMMC 300 reads data from a flash memory in response to the first PR command 921 and stores (922) the data in a data buffer.

The host 200 sends a data RO command 923 to the eMMC 300 in order to read the data from the data buffer. The eMMC 300 transmits (924) the data stored in the data buffer to the host 200 through the data bus DAT in response to the data RO command 923. The host 200 receives the data through the data bus DAT and stores (925) it in a host memory. Meanwhile, before the data transfer 924 is completed, that is, while the data is being transferred (924), the host 200 sends a next PR command 926 to the eMMC 300, so that the eMMC 300 can prepare a next read operation. The eMMC 300 reads data from the flash memory and stores (927) it in the data buffer in response to the PR command 926.

In this manner, the host 200 sends a PR command to the eMMC 300 even while data is being transferred or the eMMC 300 is in the busy state to allow the eMMC 300 to prepare data for a next read operation, thereby increasing data read performance. In other words, since the eMMC 300 receives the PR command in advance and prepares for the next read operation (for example, the eMMC 300 reads data from the flash memory and stores it in the data buffer), thereby increasing the read performance.

In the embodiments shown in part (b) in FIG. 9, the data RO command corresponds to the PR command one on one, but example embodiments of the inventive concepts are not restricted to the current embodiments. In other embodiments, all of read data prepared using a plurality of PR commands may be transmitted to the host 200 at a time using a single data RO command.

Figure 10:
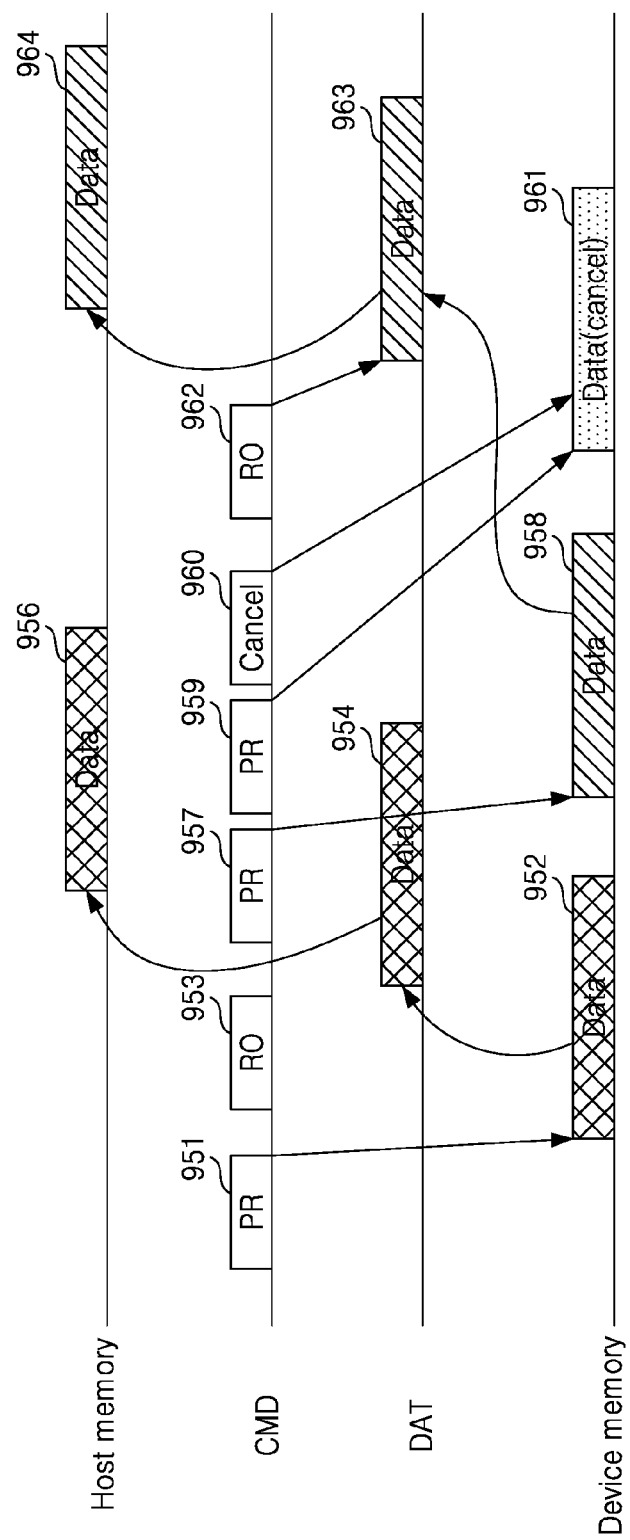
FIG. 10 is a schematic timing chart illustrating the operations of a non-volatile memory card system according to some example embodiments of the inventive concepts.

FIG. 10 is a schematic timing chart illustrating the operations of the non-volatile memory card system 100 according to some example embodiments of the inventive concepts. The host 200 sends a first PR command 951 to the eMMC 300. The eMMC 300 reads data from a flash memory in a response to the first PR command 951 and stores (952) the data in a data buffer.

The host 200 sends a data RO command 953 to the eMMC 300 in order to read the data from the data buffer. The eMMC 300 transmits (954) the data stored in the data buffer to the host 200 through the data bus DAT in response to the data RO command 953. The host 200 receives the data through the data bus DAT and stores (956) it in a host memory.

During the data transfer (954), the host 200 consecutively sends a second PR command 957 and a third PR command 959 to the eMMC 300. The eMMC 300 reads data from the flash memory and stores (958) it in the data buffer in response to the second PR command 957 and reads data from the flash memory and stores (961) it in the data buffer in response to the third PR command 959. The host 200 may cancel the third PR command 959 before reading the data from the data buffer.

For instance, the host 200 may send the eMMC 300 a cancel command 960 for cancelling the third PR command 959. The cancel command 960 may specifically cancel part or all of previous PR commands. The eMMC 300 cancels the third PR command 959 in response to the cancel command 960. For instance, when the cancel command 960 is received before data corresponding to the third PR command 959 is read from the flash memory, the third PR command 959 may be removed from a command register without a data read operation being performed. When the cancel command 960 is received after the data is read in response to the third PR command 959 and is stored in the data buffer, the data in the data buffer may be removed or invalidated.

The host 200 sends a data RO command 962 to the eMMC 300 in order to read the data from the data buffer. The eMMC 300 transmits (963) the data 958 stored in the data buffer to the host 200 through the data bus DAT in response to the data RO command 962. The host 200 receives the data through the data bus DAT and stores (964) it in the host memory.

Figure 11:
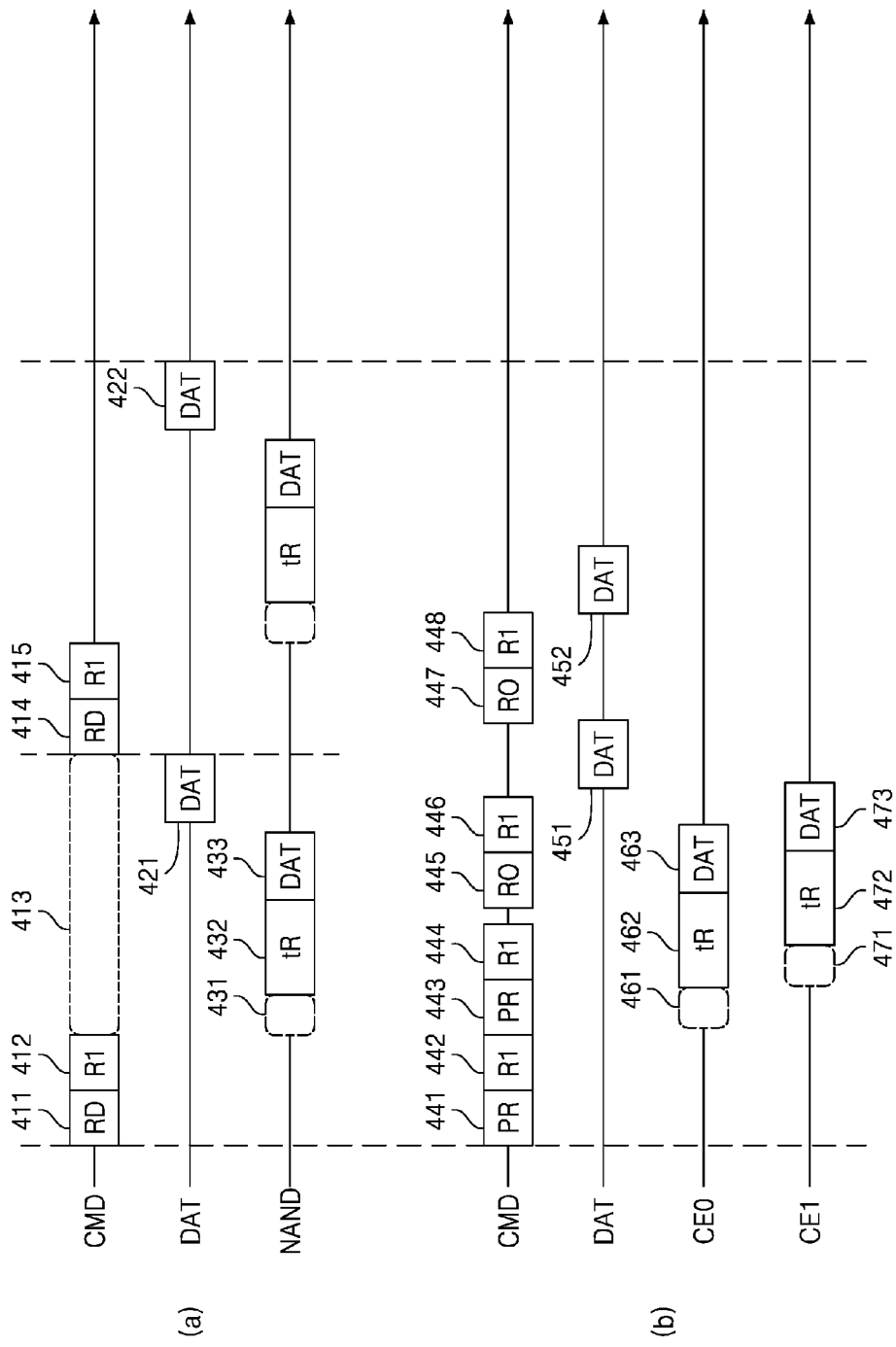
FIG. 11 is a schematic timing chart for the comparison between a conventional read operation of an eMMC and a read operation according to other example embodiments of the inventive concepts.

FIG. 11 is a schematic timing chart for the comparison between a conventional read operation of an eMMC and a read operation according to other example embodiments of the inventive concepts. Part (a) in FIG. 11 shows the conventional read operation and part (b) in FIG. 11 shows the read operation according to the example embodiments of the inventive concepts.

Referring to part (a) in FIG. 11, when a host sends an RD command 411 to the eMMC through a command bus, the eMMC sends an R1 response 412 to the RD command 411 to the host through the command bus. The eMMC prepares (431) to read data from a flash memory NAND in response to the RD command 411, reads (432 and 433) data from flash memory cells, and transmits (421) the data to the host through data buses.

The host can send a subsequent RD command 414 only after receiving the data 421 corresponding to the RD command 411. Accordingly, the host is forced to stand by (413) until receiving the data 421 since receiving the R1 response 412 to the RD command 411.

However, referring to part (b) in FIG. 11, the host 200 sends a first PR command 441 to the eMMC 300. The eMMC 300 sends to the host 200 an R1 response 442 to the first PR command 441. Also, the eMMC 300 reads (461 and 462) data from the flash memory CE0 in response to the first PR command 441 and stores (463) the data in a data buffer.

Upon receiving the R1 response 442 from the eMMC 300, the host 200 sends a second PR command 443 to the eMMC 300. In other words, the host 200 can send the second PR command 443 for reading next data to the eMMC 300 in a state where data corresponding to the first PR command 441 has not been received yet.

The eMMC 300 sends an R1 response 444 to the second PR command 443 to the host 200 and also reads (471 and 472) data from the flash memory CE1 in response to the second PR command 443 and stores (473) the data in the data buffer.

In this manner, the host 200 can send up to as many PR commands as a maximum multi-queue depth N. For instance, when the multi-queue depth N is 4, the host 200 may send up to four PR commands. The multi-queue depth N may be stored in the EXT_CSD register 371 of the eMMC 300. The host 200 may read the EXT_CSD register 371 using a particular command, e.g., SEND_EXT_CSD, and recognize the multi-queue depth N.

The eMMC 300 may read data from the flash memory 370 using a parallel operation. For instance, the eMMC 300 may perform in parallel an operation (461 through 463) of reading data from the first memory element CE0 of the flash memory 370 and an operation (471 through 473) of reading data from the second memory element CE1 of the flash memory 370 using a multi-plane read operation.

The host 200 sends a data RO command 445 to the eMMC 300 in order to read out the data stored in the data buffer. The eMMC 300 sends an R1 response 446 to the data RO command 445 and also transfers the data stored in the data buffer to the host 200 through data buses. At this time, the data 451 transferred may be data 463 read from the flash memory CE0 in response to the first PR command 441. The data RO command 445 may be a command newly defined between the host 200 and the eMMC 300 for a data read operation according to some example embodiments of the inventive concepts.

The host 200 sends a data RO command 447 to the eMMC 300 in order to read out the next data stored in the data buffer. The eMMC 300 sends an R1 response to the data RO command 447 and also transfers the data stored in the data buffer to the host 200 through the data buses. At this time, the data 452 transferred may be data 473 read from the flash memory CE1 in response to the second PR command 443.

As described above, according to the example embodiments of the inventive concepts, an idle time between commands is reduced, so that read performance is increased. In other words, the eMMC 300 receives PR commands in advance and makes preparations for read operations (e.g., preparations of reading data from the flash memory 370 and storing the data in the data buffer) at a time or in parallel, thereby increasing the read performance.

Figure 12:
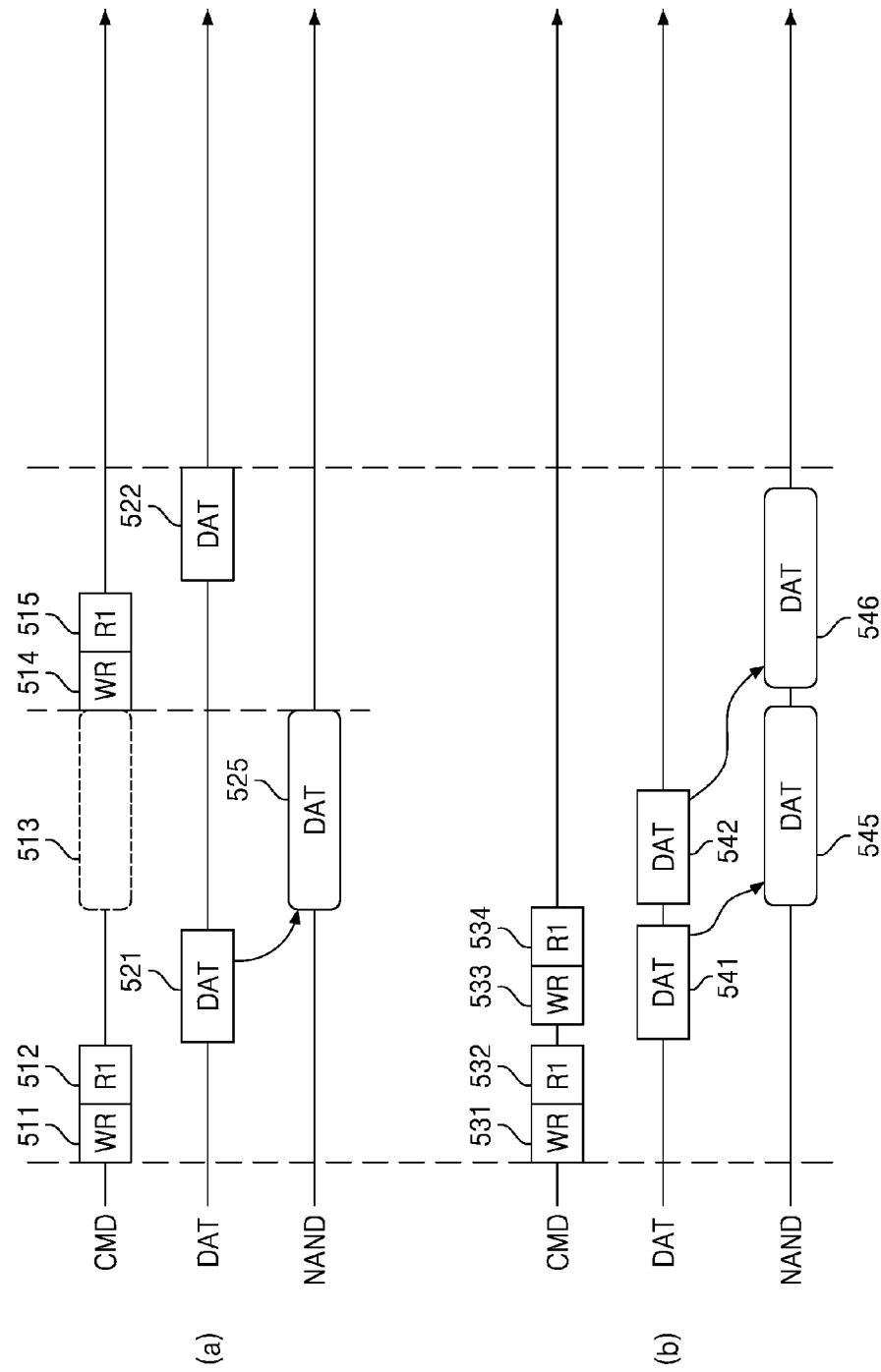
FIG. 12 is a schematic timing chart for the comparison between a conventional write operation of an eMMC and a write operation according to some example embodiments of the inventive concepts.

FIG. 12 is a schematic timing chart for the comparison between a conventional write operation of an eMMC and a write operation according to some example embodiments of the inventive concepts. Part (a) in FIG. 12 shows the conventional write operation and part (b) in FIG. 12 shows the write operation according to the example embodiments of the inventive concepts.

Referring to part (a) in FIG. 12, when a host sends a write (WR) command 511 to the eMMC through a command bus, the eMMC sends an R1 response 512 to the WR command 511 to the host through the command bus. Upon receiving the R1 response 512, the host transfers (521) data related with the WR command 511 to the eMMC through data buses. The eMMC programs (525) the data received from the host to a flash memory. Until the eMMC completes the programming of the data to the flash memory, the eMMC is in a busy state. The eMMC may inform the host of the busy state through one (e.g., DAT[0]) of the data buses. The host can send a subsequent WR command 514 to eMMC only after standing by (513) until the data writing to the flash memory is completed.

However, referring to part (b) in FIG. 12 according to the example embodiments of the inventive concepts, the host 200 sends a first WR command 531 to the eMMC 300. The eMMC 300 sends to the host 200 an R1 response 532 to the first WR command 531.

Upon receiving the R1 response 532, the host 200 transfers (541) data related with the first WR command 531 to the eMMC 300 through data buses and may also send a second WR command 533 to the eMMC 300 while transferring the data. The eMMC 300 may receive the second WR command 533 from the host 200 and send an R1 response 534 to the host 200 before it completely programs (545) the data 541 related with the first WR command 531 to the flash memory 370.

In this manner, the host 200 may send up to as many WR commands as the maximum multi-queue depth N. For instance, when the multi-queue depth N is 4, the host 200 may send up to four WR commands.

The eMMC 300 may sequentially write (545 and 546) data to the flash memory 370. In other embodiments, the eMMC 300 may write data to the flash memory 370 using a parallel operation. For instance, the eMMC 300 may perform in parallel an operation of programming data to the first memory element CE0 of the flash memory 370 and an operation of programming data to the second memory element CE1 of the flash memory 370 using a multi-plane program operation.

Figure 13:
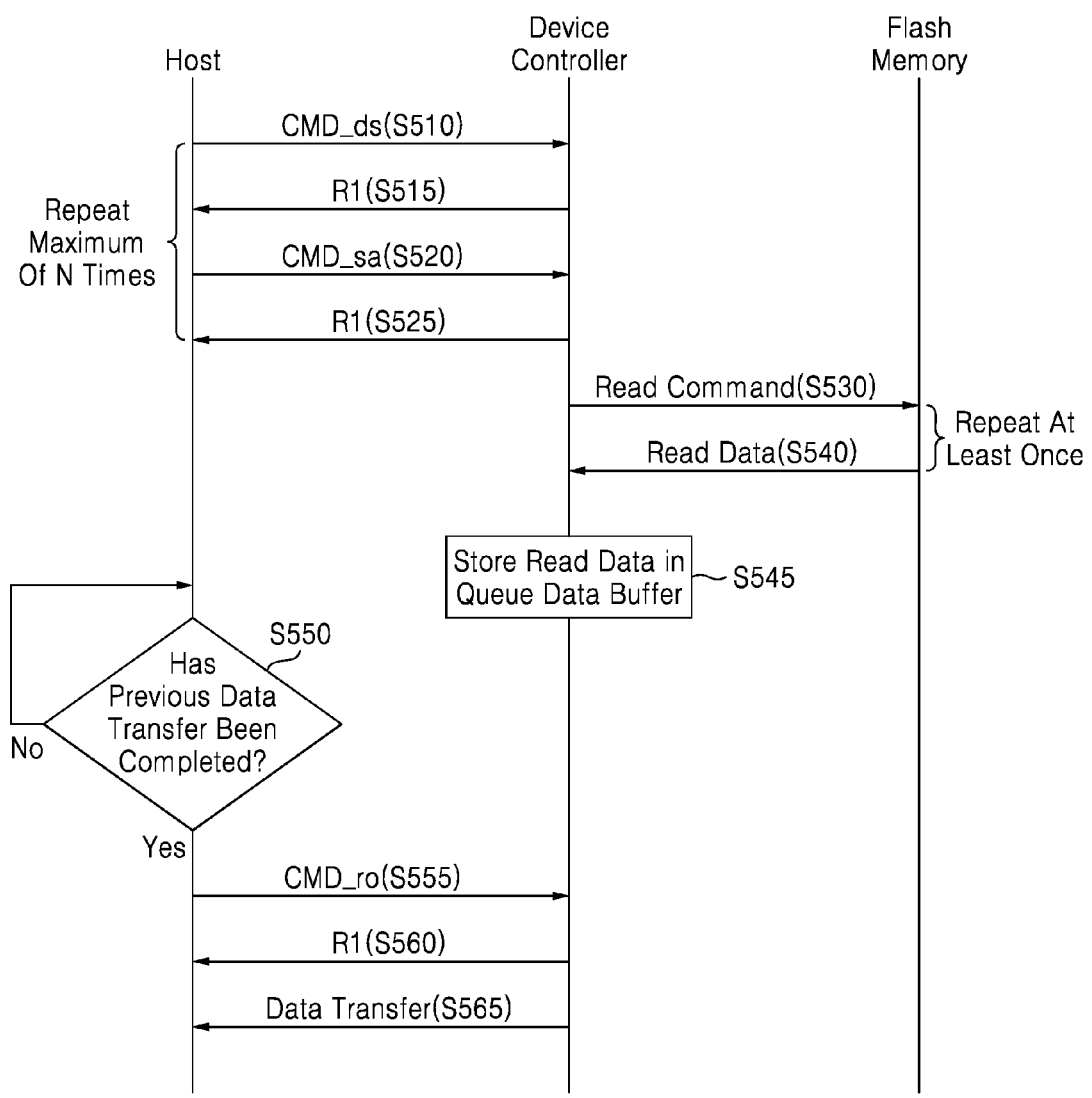
FIG. 13 is a flowchart of a read operation according to further example embodiments of the inventive concepts.

FIG. 13 is a flowchart of a read operation according to further example embodiments of the inventive concepts. The host 200 sends the device controller 310 a size specifying command CMD_ds for specifying the size of data to be read in operation S510. In response to the size specifying command CMD_ds, the device controller 310 sends an R1 response to the host 200 in operation S515 and stores a data size included in the size specifying command CMD_ds in the device command register 325.

After receiving the R1 response from the eMMC 300, the host 200 sends an address specifying command CMD_sa to the device controller 310 in operation S520. The device controller 310 sends an R1 response to the host 200 in response to the address specifying command CMD_sa in operation S525 and stores a start address in the device command register 325.

Operations S510 through S525 may be repeated up to as many times as the maximum multi-queue depth N and may be performed even while previous data is being transferred through data buses.

The size specifying command CMD_ds and the address specifying command CMD_sa may correspond to a PR command that has been described above. In other words, the PR command may be implemented as a command set including at least two commands.

The device controller 310 sends a read command to the flash memory 370 according to the start address and the data size stored in the device command register 325 in operation S530 and reads data from the flash memory 370 in operation S540. The device controller 310 stores the data in a data buffer in operation S545.

When previous data transfer is completed (YES) in operation S550, the host 200 sends a data read-out command CMD_ro to the device controller 310 in operation S555. In response to the data read-out command CMD_ro, the device controller 310 sends an R1 response to the host 200 in operation S560. In addition, the device controller 310 transmits the data in the data buffer to the host 200 in operation S565. The data read-out command CMD_ro may be the same as a data RO command described above.

Figure 14:
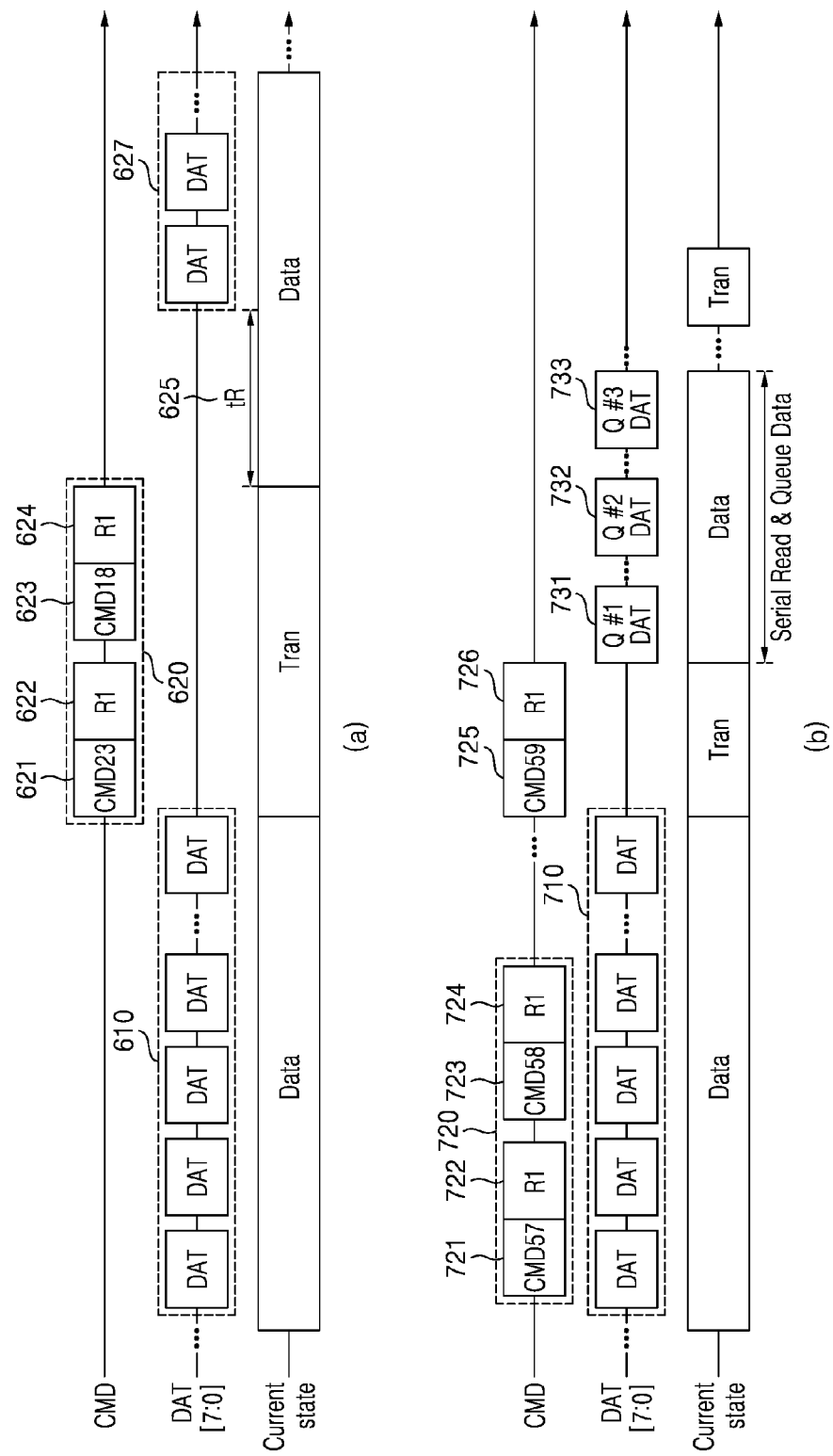
FIG. 14 is a schematic timing chart for the comparison between a conventional read operation of an eMMC and a read operation according to other example embodiments of the inventive concepts.

FIG. 14 is a schematic timing chart for the comparison between a conventional read operation of an eMMC and a read operation according to other example embodiments of the inventive concepts. Part (a) in FIG. 14 shows the conventional read operation and part (b) in FIG. 14 shows the read operation according to the example embodiments of the inventive concepts.

Referring to part (a) in FIG. 14, when a current state is a data transfer state, that is, while data is being transferred (610) through a data bus, a host cannot send a command for reading or writing data from or to a flash memory except for a particular command, e.g., a stop command or an abort command for stopping a previous command. Only after the data transfer 610 is completed, the host can send a normal read command 620 to an eMMC. The eMMC reads (tR or 625) data from the flash memory in response to normal data read commands 621 and 623 and transmits (627) the data to the host. While the eMMC is reading (625) the data from the flash memory and transmitting (627) the data to the host, the host cannot send a subsequent read command. Therefore, the host needs to wait for the data to be completely received since sending the read command.

However, referring to part (b) in FIG. 14, the host 200 sends a PR command 720 to the eMMC 300 even during data transfer 710. In detail, the host 200 sends a size specifying command, i.e., CMD57 721 to the eMMC 300 and the eMMC 300 sends to the host 200 an R1 response 722 to the CMD57 721. Next, the host 200 sends an address specifying command, i.e., CMD58 723 to the eMMC 300 and the eMMC 300 sends to the host 200 an R1 response 724 to the CMD58 723. Here, CMD57 721 corresponds to the size specifying command CMD_ds illustrated in FIG. 13 and CMD58 723 corresponds to the address specifying command CMD_sa illustrated in FIG. 13. The PR command 720 is implemented as a command set including CMD57 721 and CMD58 723. The host 200 may send a PR command including CMD57 and CMD58 to the eMMC 300 N times where N is an integer of at least 1.

The eMMC 300 reads data from the flash memory 370 in response to the PR command 720 and stores the data in a data buffer. Meanwhile, the data 710 being transferred may be stored in a normal buffer separated from the data buffer.

When the transfer of the previous data 710 is completed, the host 200 sends a data read-out command, i.e., CMD59 726 to the eMMC 300 in order to read out data 731 through 733 from the data buffer. The eMMC 300 sends an R1 response 726 to the host 200 in response to the CMD59 726 and transmits the data 731 through 733 stored in the data buffer to the host 200 through data buses.

Figure 15:
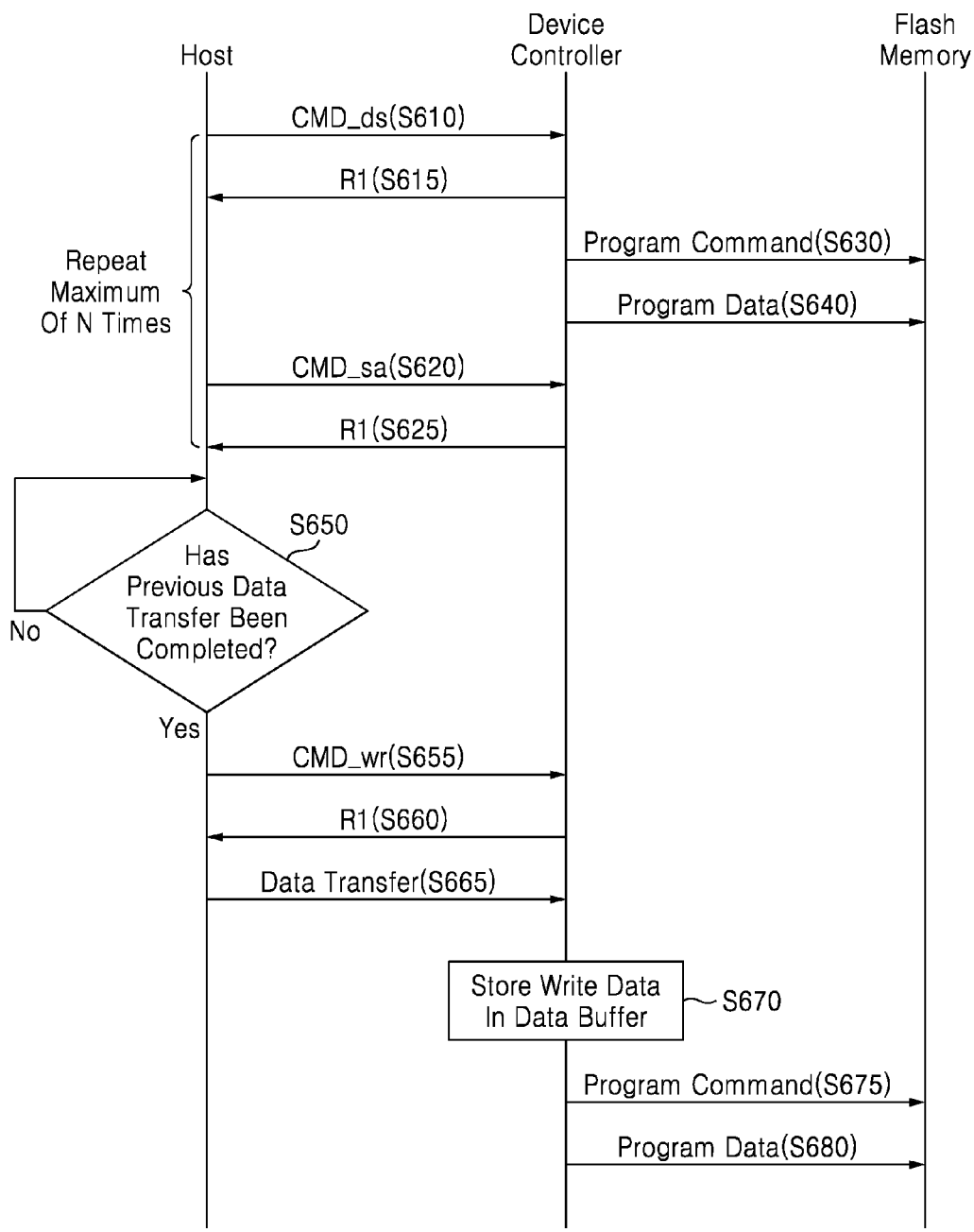
FIG. 15 is a flowchart of a write operation according to other example embodiments of the inventive concepts.

FIG. 15 is a flowchart of a write operation according to other example embodiments of the inventive concepts. The host 200 transmits a size specifying command CMD_ds for specify the size of data to be written to the device controller 310 in operation S610. The device controller 310 sends an R1 response to the host 200 in response to the size specifying command CMD_ds in operation S615 and stores a data size corresponding to the size specifying command CMD_ds in the device command register 325.

After receiving the R1 response from the eMMC 300, the host 200 sends an address specifying command CMD_sa to the device controller 310 in operation S620. The device controller 310 sends an R1 response to the host 200 in response to the address specifying command CMD_sa in operation S625 and stores a start address in the device command register 325.

Operations S610 through S625 may be repeated up to as many times as the maximum multi-queue depth N and may be performed even while previous data is being transferred through the data buses although not shown. Operations S610 through S625 may also be performed even while the device controller 310 is applying a program command to the flash memory 370 in operation S630 for the programming of the previous data and is programming the previous data to the flash memory 370 in operation S640. At this time, the previous data that is being transferred or programmed to the flash memory 370 may be stored in the normal buffer.

When the transfer of the previous data is completed (i.e., YES) in operation S650, the host 200 sends a data write-in command CMD_wr to the device controller 310 in operation S655. In response to the data write-in command CMD_wr from the host 200, the device controller 310 sends an R1 response to the host 200 in operation S660. Then, the host 200 transfers the write data to the eMMC 300 in operation S665.

The eMMC 300 stores the write data in the data buffer in operation S670. The device controller 310 applies to the flash memory 370 a program command for the programming of the data stored in the data buffer in operation S675 and programs the write data to the flash memory 370 in operation S680.

In the embodiments illustrated in FIG. 15, the size specifying command CMD_ds and the address specifying command CMD_sa may form a prepare-write command which is a sort of non-data transfer command that is not accompanied by data transfer. The data write-in command CMD_wr may be a data transfer command, which is accompanied by transfer of write data.

Figure 16:
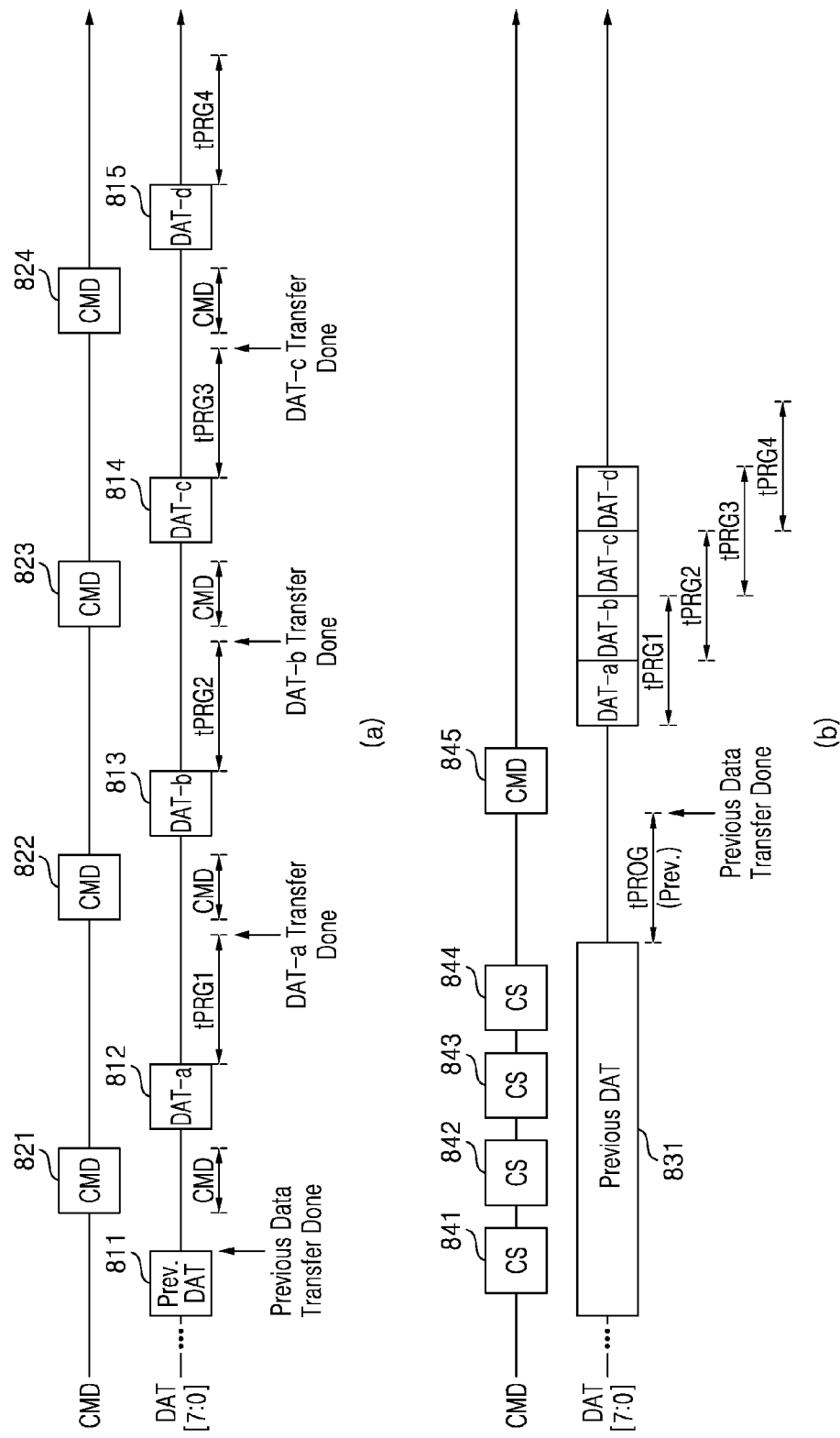
FIG. 16 is a schematic timing chart for the comparison between a conventional write operation of an eMMC and a write operation according to further example embodiments of the inventive concepts.

FIG. 16 is a schematic timing chart for the comparison between a conventional write operation of an eMMC and a write operation according to further example embodiments of the inventive concepts. Part (a) in FIG. 16 shows the conventional write operation and part (b) in FIG. 16 shows the write operation according to the example embodiments of the inventive concepts.

Referring to part (a) in FIG. 16, after the completion of the transfer of previous data 811, a host sends an eMMC data 812, a write command 821, and data DAT-a or 812 corresponding to the write command 821. The eMMC programs (tPRG1) the data DAT-a or 812 to a flash memory. Only when the data DAT-a or 812 is completely programmed to the flash memory, the transfer of the data DAT-a or 812 is completed. Accordingly, the host stands by until the programming of the data DAT-a is completed and only then sends another write command 822 and data DAT-b or 813 corresponding to the write command 822 to the eMMC.

However, referring to part (b) in FIG. 16, the host 200 sends prepare-write commands CS or 841 through 844 to the eMMC 300 even during the transfer of previous data 831. The prepare-write commands CS or 841 through 844 may include a size specifying command CMD_ds and an address specifying command CMD_sa, as shown in FIG. 15.

The eMMC 300 sequentially receives and stores the prepare-write commands CS or 841 through 844 in the device command register 325. When the transfer and the programming (tPROG) of the previous data 831 is completed, the host 200 sends the eMMC 300 a data write-in command 845 and data DAT-a, DAT-b, DAT-c, and DAT-d corresponding to the data write-in command 845. The eMMC 300 stores the data DAT-a, DAT-b, DAT-c, and DAT-d in the data buffer and programs the data DAT-a, DAT-b, DAT-c, and DAT-d stored in the data buffer to the flash memory 370.

In the example embodiments of the inventive concepts, an eMMC is explained as an example. However, example embodiments of the inventive concepts are not restricted thereto but may be applied to any non-volatile memory card including a command bus and a data bus and any host controlling the card.

As described above, according to some example embodiments of the inventive concepts, a host can send a command to eMMC during data transfer or before the eMMC completes a read/write operation, so that preparation for a next read/write command is performed even during the read/write operation of the eMMC. As a result, the read/write performance of the eMMC is increased.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A host device configured to be connected with an external memory through a command bus and one or more data buses, the host device comprising:
   a processor configured to generate a plurality of commands including a first command and a second command following the first command, the first command indicating first data; and
   a host controller configured to transmit the plurality of commands to the external memory at a request of a task, and configured to transmit the first data to the external memory,
   wherein the second command is transmitted to the external memory, while the external memory is in a busy state,
   the host controller is informed of the busy state of the external memory, and
   the first command and the second command are transmitted from the host device to the external memory through the command bus.

2. The host device of claim 1, further comprising a memory.

3. The host device of claim 2, wherein the host controller includes a plurality of host command registers for storing information on the plurality of commands.

4. The host device of claim 3, wherein the plurality of host command registers are provided separated from the memory.

5. The host device of claim 3, wherein the plurality of host command registers are provided in the memory.

6. The host device of claim 2, wherein the memory is a dynamic random access memory (DRAM) or a static random access memory (SRAM).

7. The host device of claim 1, wherein the host controller includes:
   a data input/output (I/O) unit configured to transmit the first data; and
   a task management unit configured to manage creation and termination of the task; and
   a command generation unit configured to generate the plurality of commands at a request of the task and to send the plurality of commands to the external memory.

8. The host device of claim 7, wherein the first command and the second command are in the same task.

9. A nonvolatile memory device configured to be connected with an external device through a command bus and one or more data buses, the nonvolatile memory device comprising:
   a memory controller configured to,
      receive a plurality of commands including a first command and a second command following the first command from the external device, the first command indicating first data, and
      receive the first data from the external device; and
   a flash memory configured to store the first data,
   wherein the second command is received by the memory controller, while the nonvolatile memory device is in a busy state,
   the busy state of the nonvolatile memory device is informed to the external device, and
   the first command and the second command are received at the nonvolatile memory device from the external device through the command bus.

10. The nonvolatile memory device of claim 9, wherein the first command and the second command are in a same task.

11. The nonvolatile memory device of claim 9, wherein the flash memory includes a register configured to store device properties and selected modes.

12. The nonvolatile memory device of claim 9, wherein the memory controller includes:
   a host interface configured to receive a clock signal, a first command and a second command, and to generate responses; and
   a central processing unit (CPU) configured to control operations of the host interface.

13. A non-volatile memory card system comprising:
   a nonvolatile memory device including,
      a memory controller configured to,
         receive a first command, the first command indicating first data,
         receive the first data, and
         receive a second command, and
      a flash memory configured to store the first data;
   a host device including,
      a processor configured to generate a plurality of commands including the first command and the second command following the first command; and
      a host controller configured to transmit the first command to the nonvolatile memory device, configured to transmit the first data to the nonvolatile memory device, and configured to transmit the second command to the nonvolatile memory device; and
   a command bus configured to connect the nonvolatile memory device and the host device to each other,
   wherein the second command is transmitted from the host device to the nonvolatile memory device, while the nonvolatile memory device is in a busy state,
   the host controller is informed of the busy state of the nonvolatile memory device,
   the host controller includes a task management processor configured to manage creation and termination of a task, and includes command generation unit configured to generate the plurality of commands at a request of the task and to send the plurality of commands to the nonvolatile memory device, and
   the first command and the second command are transmitted from the host device to the nonvolatile memory device through the command bus.

14. The non-volatile memory card system of claim 13, wherein the second command is received by the memory controller, before the first data is received by the memory controller, while the first data is received by the memory controller or while the nonvolatile memory device is in the busy state.

15. The non-volatile memory card system of claim 13, wherein the host controller includes a data input/output (I/O) unit configured to transmit the first data.

16. The non-volatile memory card system of claim 13, wherein the first command and the second command are in a same task.

17. The non-volatile memory card system of claim 13, wherein the nonvolatile memory device is a non-volatile memory card or an embedded multimedia card (eMMC).

* * * * *